US005764381A

United States Patent [19]
Landsman

[11] Patent Number: 5,764,381
[45] Date of Patent: Jun. 9, 1998

[54] INTERNAL DRUM RECORDER WITH ARRAY IMAGING

[75] Inventor: Robert M. Landsman, Boynton Beach, Fla.

[73] Assignee: Scitex Corporation Ltd., Herzua, Israel

[21] Appl. No.: 677,839

[22] Filed: Jul. 10, 1996

[51] Int. Cl.⁶ ............................................ G11B 7/00
[52] U.S. Cl. ............................. 358/490; 358/493
[58] Field of Search .................... 358/489–494, 358/296–297; 355/210–213, 104–111, 117; 399/116–117, 158–159, 303

[56] References Cited

U.S. PATENT DOCUMENTS

| | | | |
|---|---|---|---|
| 3,816,659 | 6/1974 | Landsman | 178/7.6 |
| 4,262,594 | 4/1981 | Landsman | 101/389.1 |
| 4,334,770 | 6/1982 | Landsman | 355/104 |
| 4,362,805 | 12/1982 | Landsman | 430/200 |
| 4,423,426 | 12/1983 | Kitamura | 346/108 |
| 4,764,815 | 8/1988 | Landsman | 358/496 |
| 4,980,549 | 12/1990 | Baldwin | 250/235 |
| 4,985,779 | 1/1991 | Gall | 358/298 |
| 4,989,019 | 1/1991 | Loce et al. | 346/108 |
| 5,502,709 | 3/1996 | Shinada | 358/493 |

*Primary Examiner*—Edward L. Coles, Sr.
*Assistant Examiner*—Stephen Brinich
*Attorney, Agent, or Firm*—Lott & Friedland, P.A.

[57] ABSTRACT

An internal drum recorder images a media to a radiation pattern using an image array, which extends along a primary track, such as a helical track, and in a direction essentially perpendicular to the primary track. In one embodiment, the source of radiation is a laser aimed along the longitudinal axis of the drum, deflected and applied through a light modifier within a spinner. The light modifier is a device breaking the single laser beam into a number of sub-beams. Alternately, a number of laser diodes rotating within a translatable spinner may be used to produce the image. A gripper bar rotating about the longitudinal axis of the drum facilitates introducing and removing new sheets into the drum. A focus detector rotating within the spinner is used to correct the radial distance to the media surface from the spinner.

35 Claims, 5 Drawing Sheets

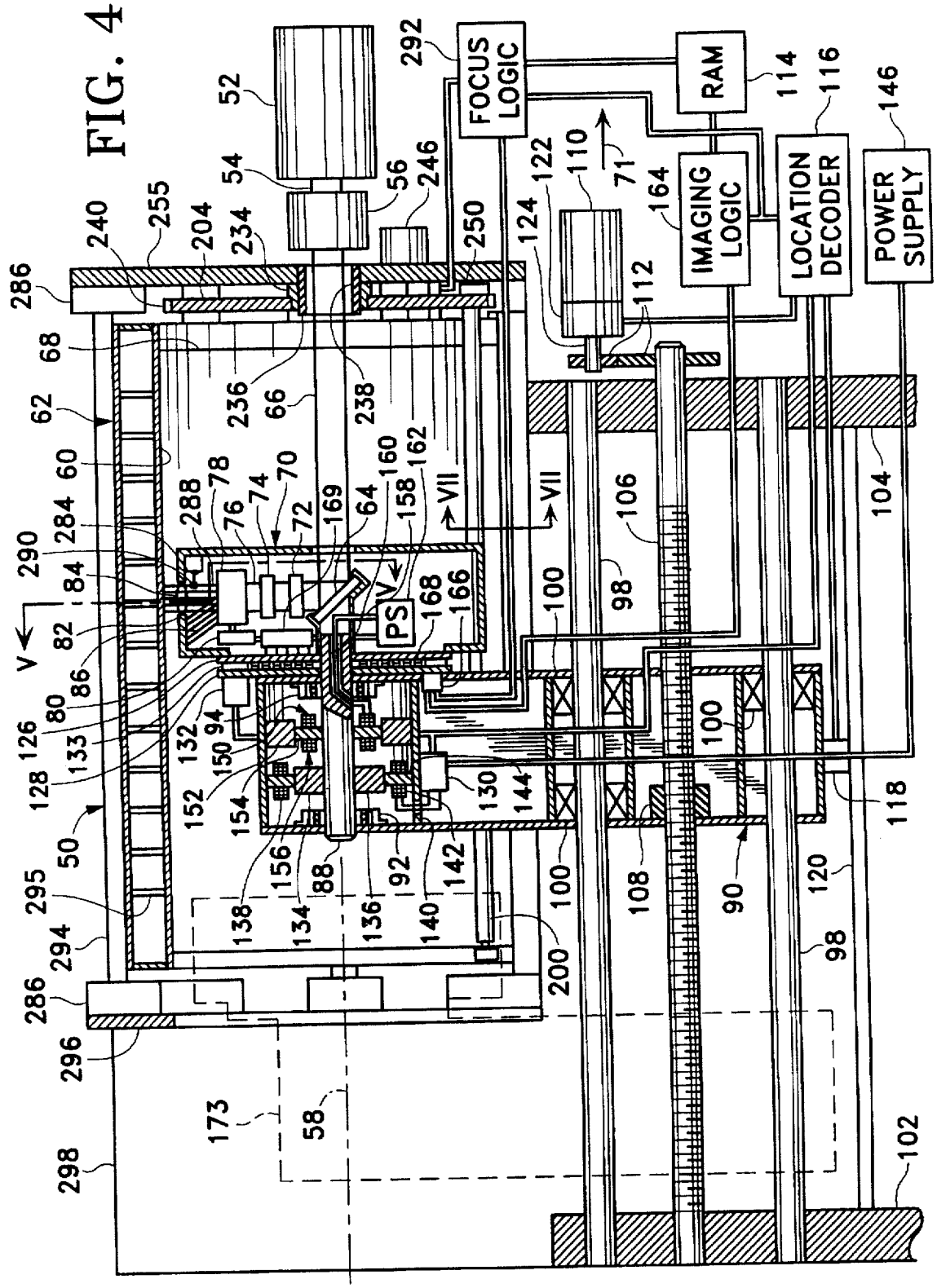

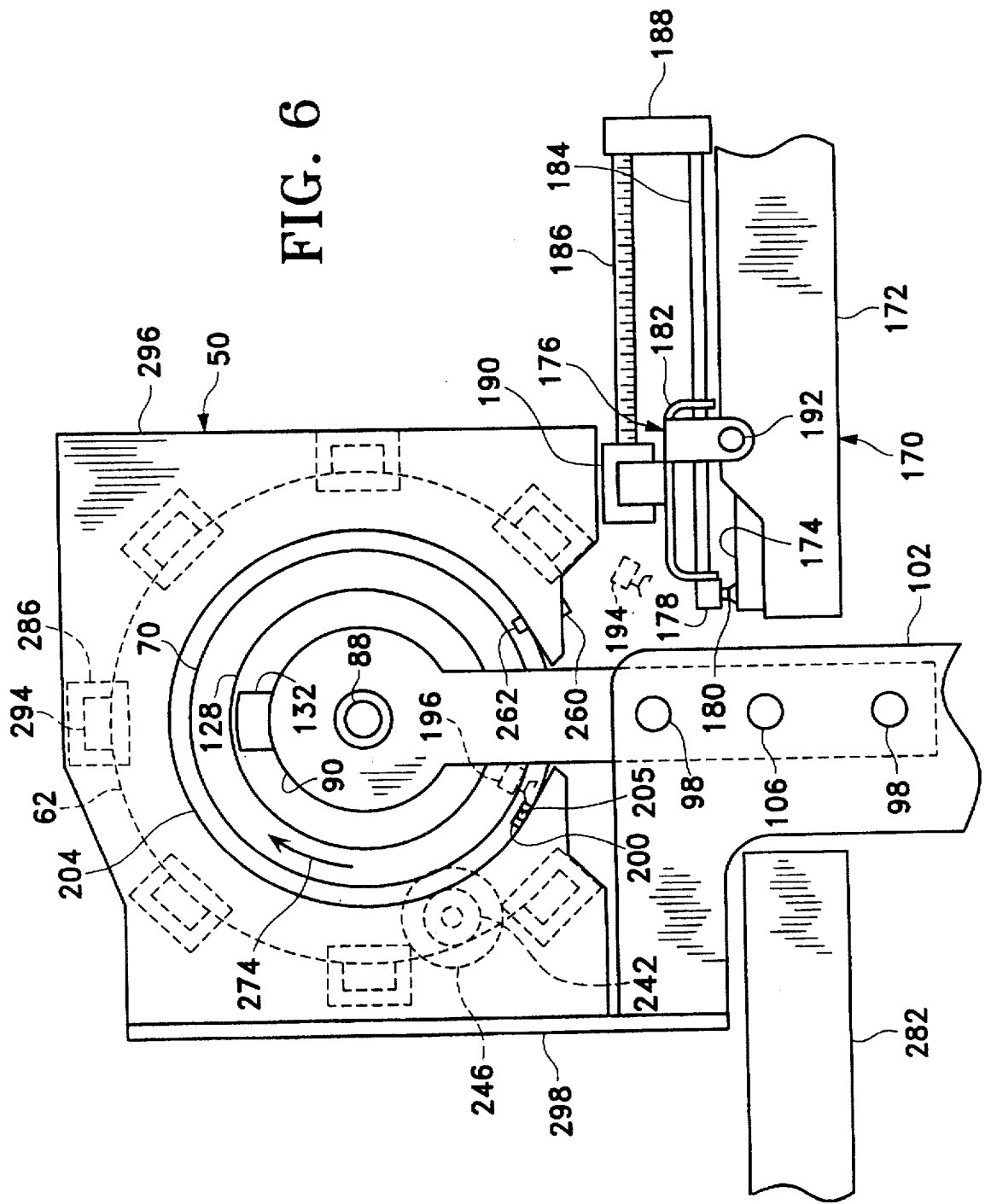

INTERNAL DRUM RECORDER WITH ARRAY IMAGING

BACKGROUND OF THE INVENTION

1. Field of the Invention

This invention relates to an internal drum recorder for exposing a medium to an image formed by radiation, and more particularly, to an internal drum recorder for exposing a medium to an array image formed by a number of time varying radiation sources, such that the internal drum recorder combined with the array imaging achieves both a high scan and high optical efficiency with high productivity.

2. Background Information

A drum recorder is a device providing a means to place an image on a photosensitive medium held in place on a drum while the image is constructed using a time varying radiation source. The medium may, for example, be composed of photographic film which is subsequently developed and used to produce many copies by means of one of a number of well known offset printing processes. The imaging source (s) may be various types of devices, including laser devices producing visible or invisible (such as infrared) light.

If a single light beam is used, drive means are provided to ensure that the single beam is driven over the entire image area of the medium. In a rotational direction, the light beam is moved across the width of the image area by relative rotation between the drum and the light beam. In an axial direction, the imaging source is moved along the length of the image area by movement of the imaging source or by movement of a the imaging source and a device deflecting the image from the source onto the medium. If the light beam is moved along the axial direction in a series of steps, the medium held on the drum is imaged by a series of concentric rings. If the imaging source is moved along the axial direction at a constant speed, the medium held on the drum is imaged according to portions of a single helix. In either case, the light beam is varied with time to produce a useful image. Depending on the particular recording medium, the process for its development, and the process in which it is subsequently used, the imaging source may be turned on for light areas and off for dark areas, or vice versa.

Array imaging is a method for exposing the medium in a number of places extending in two dimensions, instead of in a single dimension, as along a helical track of a single time varying light beam. Array imaging may be provided through the use of multiple imaging sources, as drive means ensure that the multiple beams derived from the imaging sources, taken together, are driven over the entire image area of the medium, as the multiple beams are moved together to image parallel scan lines. Adjacent scan lines may be separated by a distance allowing one or more tracks to be placed between them, so that, for example, in a three beam system, the first, fourth, and seventh scan lines are simultaneously written first; the second, fifth, and eighth scan lines are simultaneously written next; the third, sixth, and ninth scan lines are simultaneously written next; etc. If the light beams are as close together, in the axial direction, as the scan lines imaged onto the medium, a three beam system writes the first, second, and third scan lines first, and the fourth, fifth, and sixth scan lines next, etc. As with a single beam, the multiple light beams may be moved together in a stepping pattern to produce rings, or at a constant speed to produce helical patterns. Array imaging may alternately be provided by deflecting a single light beam in a sub-scan along a path which is essentially perpendicular to the path in which it is otherwise driven.

In an external drum recorder, the medium on which the image is to be recorded is fastened to the outside of a drum which is rotated during the recording process. One or more imaging source(s) is/are moved along the length of the drum (in the axial direction) to produce the image. External drum recorders have been used to record images since the development of the first photo facsimile machines by Bell Laboratories around 1928. This method continues to be a preferred arrangement for precision recording, allowing the production of large images having the same image quality at all points. This device can have a high scan efficiency, with all of the drum area except for a strip used to clamp the media in place being used for imaging, and a high optical efficiency, with simple, efficient optics being used to direct energy to the medium.

However, external drum recorders have several disadvantages. The loading of a film media around the drum is complex, and the times required to bring the drum up to the required rotational speed and to stop the drum reduce the throughput, or productivity of the device. When the drum is brought up to speed, the medium wrapped around it has a tendency to distort with centrifugal forces. Vacuum systems used to improve the adhesion of the medium to the drum require a complex, high friction coupling to connect a stationary vacuum pump to the spinning drum. Also, with such systems, the throughput of the device is further reduced by the time required to pump down air within the drum cavity.

The internal drum recorder was developed as an alternative to alleviate these problems. In such a device, the medium is fed into an arcuate portion of an internal drum, to be held stationary while a spinner rotating within the drum and scanning along the axis of the drum exposes the media to radiation. Since the medium is stationary, the loading mechanism is simpler and more reliable that of the external drum recorder. If a vacuum system is used to hold the medium in place, it does not require the rotary vacuum coupling of an external drum system. The loading system can readily be configured to handle plate materials as media. The spinner is allowed to rotate at a constant speed, even when the medium is being removed and replaced, so there is no loss of productivity due stopping the drum to replace the media.

However, the conventional internal drum recorder suffers from a productivity problem associated with the way in which the image is presented to the media. Specifically, a single beam, directed along the axis of the drum and spinner is deflected toward the media by means of a mirror surface on the spinner, which is placed at an angle with respect to this axis. To obtain a commercially satisfactory throughput from a single light beam, the spinner must rotate at a very high speed, which has historically been increased with demands for higher productivity. While, in 1974, a typical spinner operated at 6,000 rpm, in 1995, drum speeds are above 20,000 rpm, with several internal drum devices being announced to rotate at 30,000 rpm. At such high speeds, centrifugal forces, which vary as the square of the rotational speed, can lead to problems in spinner reliability, as well as to problems associated with the distortion of optical elements and with vibration caused by inadequate dynamic balance.

Historically, internal drum recorder design has been based on a simply supported beam with a carriage driven by linear motor or other means to achieve controlled linear motion. A rotary scanning system is mounted upon the carriage to direct focus laser radiation to the recording medium. The combination of the linear drive and rotary scanning system causes the locus of the focused laser beam to trace a cylindrical surface coincident with the placement of the recording medium. This system, which is very common, suffers from poor scan efficiency and a portion of the internal drum is obscured by the simply supported beam of the linear drive mechanism.

What is needed is an internal drum system that has high scan efficiency without obscuration of the recording surface and provides means to deliver data and power to the rotating scanning system in such a manner that array imaging is possible at low rotational speeds. Such a device would facilitate the combination of the simplicity and reliability of a relatively slow speed device with a level of productivity equal to or greater than that of a very high speed device.

A particular problem with building large optical devices of this type is the difficulty of maintaining the correct optical alignment and critical focal distances across the length of the device and throughout the time period that it is used. To reduce mechanical strain and creep, critical parts have been fabricated using exotic materials. Often, it is necessary to operate the device in a temperature controlled environment to ensure dimensional stability.

A number of autofocus techniques have been used to provide automatic correction of distances within optical systems. For example, an autofocus system used with compact disk players is described by D. K. Cohen, et al., in *APPLIED OPTICS*, Vol. 23, No. 4, Feb. 15, 1984, p 565.

What is needed is a way to make effective use of an autofocus technique to solve the problem of maintaining proper conjugate distances for focussing in a large internal drum recorder.

DESCRIPTION OF THE PRIOR ART

An internal drum recorder is described, in U.S. Pat. No. 4,131,916, as including a hollow tubular shaft containing optical elements for use in a helicalscanning facsimile transceiver, supported horizontally by air bearings and translated linearly along its major axis through cylindrical reading and writing stations by means of a pneumatic cylinder and piston coaxial with the shaft. An integral reaction powered air motor provides shaft rotation, a first laser beam directed into the apparatus from a first end thereof performs the reading operation, and a second laser beam, directed into the apparatus from a second end thereof, opposite the first end, performs the writing operation. Each of the laser beams is directed along the axis of rotation of the optical elements. Both reading and writing may take place within the same apparatus, or either of these operations may be executed at a remote location.

While this apparatus has worked well for a number of years, and has both high scan efficiency and high optical efficiency, it suffers from the throughput limitations associated with the use of a single laser beam to write the image. Further, the length of the unit in the linear scan direction is greater than three times the length of the scan area. Additionally, the optical scan elements are cantilevered, limiting the system to short scan lengths. What is needed is an efficient way to provide for writing on the stationary medium of an internal drum recorder with multiple beams.

An internal drum recorder with multiple beams has not been introduced to the market because in a conventionally constructed internal drum recorder with multiple beams, the image of the multiple beam source rotates as a function of angular rotation. Further, any commercial internal drum recorders have limited scan efficiency due to obscuration of the scanning beam by the linear traverse mechanism.

European patent application number 94304613.6 describes an internal drum recorder which addresses the image rotation problem. The application includes apparatus for mounting a medium in a generally cylindrical configuration about a longitudinal axis, a multi-beam light source assembly disposed at a first location along the longitudinal axis, and including a plurality of light sources which are separated from each other along an axis perpendicular to the longitudinal axis, light directing apparatus operative to direct light received from the multiple beam light source assembly to the recording substrate and apparatus for transmitting light from the multi-beam light source assembly to the light directing apparatus substantially without inaccuracies which are functions of the period of rotation of the light directing apparatus about the longitudinal axis.

In one embodiment of the European patent application, the beams produced by a stationary plurality of light sources are caused to rotate about the longitudinal axis as they are directed through a dove prism rotating about the longitudinal axis at half the rotational speed of the light directing apparatus. The dove prism includes refractive surfaces at opposite oblique angles at each end and an internally reflective surface extending therebetween parallel to the longitudinal axis. Light beams entering the dove prism parallel to the longitudinal axis are refracted by the first refractive surface toward the internally reflective surface, are reflected therefrom, and are subsequently refracted to leave the prism in a direction again parallel to the longitudinal axis. Thus, passage of an image through a stationary dove prism causes the image to be inverted in a direction perpendicular to the internally reflective surface. Passage of an image through a dove prism rotated about an axis as described above causes the image to rotate about the axis at twice the speed of rotation of the prism. A particular disadvantage of this arrangement arises from the difficulty of keeping the dove prism assembly and the light directing apparatus correctly aligned and rotating at the proper speed ratio. The patent application describes a fairly complex feedback mechanism for correcting optical errors in this system.

In another embodiment of the European patent application, the radiation sources are rotationally driven at the same speed as the light directing apparatus. A rotating unit including the radiation sources may receive the data used to control these sources over a wireless link. This embodiment also has, as a disadvantage, the complexity of separate units which must be driven at the same speed and in synchronization with one another. The European patent application does not describe the mechanical arrangement of the rotating units, nor does it describe a practical method for driving and powering the rotating radiation sources and associated electronic devices. What is needed is a simple way of configuring the radiation sources so that they can direct energy to the medium, as the multiple sources are rotated and translated as needed across the entire image area of the medium.

U.S. Pat. No. 4,577,932 describes a multi-spot light modulator using a laser diode. A single light pulse from the laser diode generates a multi-spot image of a data pattern, with each spot corresponding to an active bit of the data pattern. The ability of a pulsed laser diode to generate a narrow light pulse is used to image an acoustic wave corresponding to the data pattern without the normal degradation in resolution caused by the motion of the acoustic wave. The preferred embodiment of this device includes a laser diode and a focussing lens placed to project the magnified image of the laser diode emitting aperture onto an accousto-optic modulator.

U.S. Pat. No. 4,764,815 describes the use of an accousto optic deflector to produce a number of sub-scans essentially perpendicular to an overall scanning direction. This method is applied within a flat bed imaging system having a movable platen, writing a pattern on the medium with a single light beam which is moved to produce an array image having the effect of a number of light beams.

The multi-spot light modulator described in U.S. Pat. No. 4,577,932 and the light deflector of U.S. Pat. No. 4,764,815 are examples of the types of devices which can be used to produce array images. Still, what is needed, is a way to provide array imaging within an internal drum recorder that eliminates rotation of the array image, has low rotational speeds, and has high scan and optical efficiencies.

SUMMARY OF THE INVENTION

In accordance with one aspect of the invention, there is provided apparatus for recording an image on a medium including a hollow drum having an internal surface, at least a portion of which is cylindrical, for holding the medium. The cylindrical portion of the drum has a longitudinal axis and through the drum. The apparatus is characterized by an energy source for directing a plurality of energy beams at the medium and means for translating the plurality of energy beams in a direction parallel to the longitudinal axis. In addition, the apparatus is characterized by means, mechanically linked to the translating means, for rotating the energy beams about the longitudinal axis.

BRIEF DESCRIPTION OF THE DRAWINGS

Two preferred embodiment of the subject invention are hereafter described with specific reference being made to the following Figures, in which:

FIG. 4 is a vertical and longitudinal cross sectional view of an internal drum recorder built in accordance with a first embodiment of the present invention;

FIG. 6 is a front elevational view of the internal drum recorder of FIG. 4;

DETAILED DESCRIPTION

Figure 1:
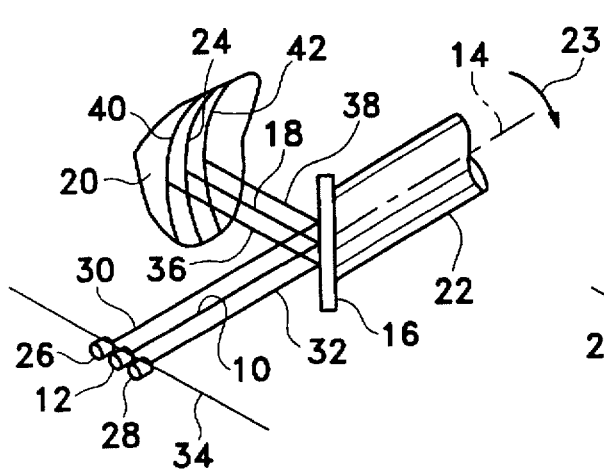
FIGS. 1 thru 3 are isometric views showing the geometric problems, associated with deflecting multiple light beams within an internal drum recorder, which are solved by using the present invention.

Referring first to FIG. 1, in a conventional internal drum recorder, as described for example in U.S. Pat. No. 4,131,916, a single light beam 10, from a single light source 12, directed along a longitudinal axis 14, is reflected by a mirror 16 as a reflected light beam 18 to the internal surface of a drum 20, on which a light sensitive recording medium has been placed. The mirror 16 forms part of a spinner 22, which is rotated about the longitudinal axis 14 in the direction of arrow 23, so that the reflected light beam 16 moves along a circular or helical track 24 on the internal surface of the drum 20.

Also shown in FIG. 1 are a pair of additional light sources 26 and 28, which produce light beams 30 and 32, respectively, in a parallel relationship with the central light beam 10. In this example, all three light sources 12, 26, 28 lie along a line 34 parallel to the reflected beam 18. The two additional light beams 30 and 32 are reflected by mirror 16 as reflected beams 36 and 38, respectively, forming tracks 40 and 42 along the internal surface of drum 20.

Figure 2:
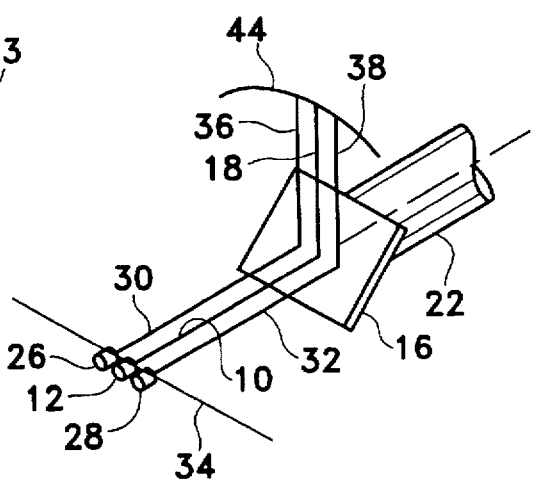

In the example of FIG. 2, mirror 16 has rotated with spinner 22 to a point at which the light beams 10, 30, 32 are reflected as light beams 18, 36, 38 extending in a direction perpendicular to the line 34 along which the light sources 12, 26, 28. However, these three reflected beams 18, 36, 38 each move essentially along a single track 44.

Figure 3:
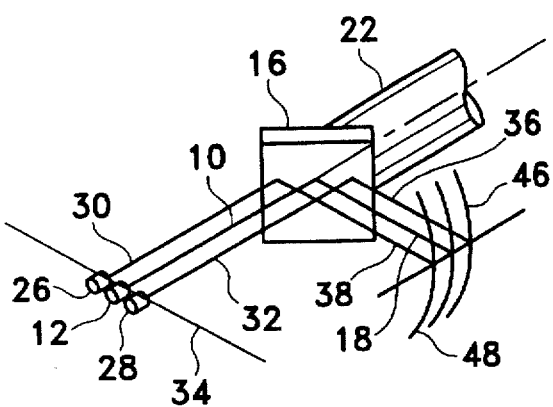

In the example of FIG. 3, mirror 16 has rotated with spinner 22 to a position 180 degrees from that of FIG. 1, with the three reflected light beams 18, 36, 38 again extending parallel to the line 34 along which the light sources 12, 26, 28 are aligned. However, the reflected light beam 36, emanating from light source 26, forms a track 46 extending farthest from the light sources 12, 26, 28, while the reflected light beam 38, emanating from light source 28, forms a track 48 closest to the light sources 12, 26, 28. This is reversed from the example of FIG. 1, in which the reflected light beam 36, emanating from light source 26, forms the track 40 extending closest to the light sources 12, 26, 28, while the reflected light beam 38, emanating from light source 28, forms a track 42 extending farthest from the light sources 12, 26, 28.

Thus, multiple stationary light beams cannot be used for imaging an internal drum after reflection off a single spinning deflection mirror. A light beam projected in alignment with the axis of mirror rotation is deflected properly to produce a circular or helical track. However, a light beam projected along either side of this central beam forms a track extending along each side of the track formed by the central beam, with this track crossing that of the central beam in two positions 180 degrees apart.

FIG. 4 is a vertical, longitudinal cross section of an internal drum recorder 50 built in accordance with a first embodiment of the present invention, which overcomes the difficulties described above with respect to FIGS. 1 3. Within the drum recorder 50, a laser 52 produces a light beam 54 which is collimated within a lens assembly 56 for transmission along the longitudinal axis 58 of the cylindrical internal surface 60 of a drum 62. A mirror 64 deflects the light beam 66 from collimating lens assembly 56 toward the internal surface 60, to which a media sheet 68 is affixed. As a part of a spinner 70, the mirror 64 is rotated about the longitudinal axis 58 while being translated in the longitudinal direction indicated by arrow 71 (in a manner described hereafter), so that an entire image area of the media 68 is scanned.

Figure 5:
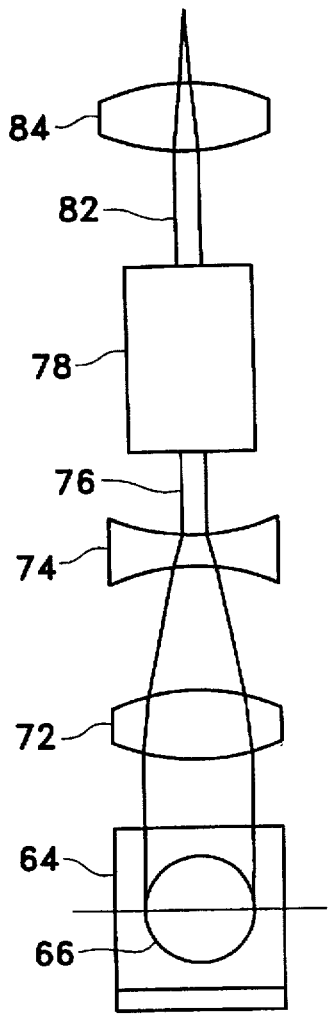
FIG. 5 is a partial transverse cross sectional view, taken as indicated by section lines V—V in FIG. 4 to show the condensing effects of cylindrical optics within the spinner 70.

FIG. 5 is a partial transverse cross section, taken as indicated by section lines V—V in FIG. 4 to show the condensing effects of a pair of cylindrical lenses 72, 74 within the spinner 70. These lenses 72, 74 have cylindrical surfaces, so the light reflected from mirror 64 is first condensed by lens 72, and then collimated by lens 74, in the plane shown in FIG. 5, without similar effects occurring in the plane shown by FIG. 4.

Referring to both FIGS. 4 and 5, this effect presents a narrow beam 76 at the entrance of a multi-spot light modulator 78, which may be, for example, of the type described in U.S. Pat. No. 4,577,932. This type of light modulator 78 is an accousto-optic modulator driven by an acoustic wave formed when a data signal is used in a single frequency amplitude modulation within an AM modulator circuit 80. This data signal represents the light and dark areas of the desired developed image formed when the latent image currently being written to the medium 68 is subsequently developed. Within the light modulator 78, the acoustic wave break up the input beam 76 into a number of sub-beams, which are individually either diffracted within the light modulator 78, or allowed to pass straight through without diffraction. The direction of travel of these sub-beams is determined by the acoustic wave in the light modulator 78 in accordance with the amplitude modulated signal provided by AM modulator circuit 80. The spatial relationships between the acoustic wave in the light modulator 78 is such that, after the sub-beams 82 passing straight therethrough, and through an external lens 84, are properly spaced apart to form the various parallel helical or circular tracks used to form the latent image on medium 68. Thus, in the example of FIG. 4, the diffracted sub-beams 84 are used to write the latent image, while the sub-beams 86 undiffracted beams are not used.

FIG. 6 is a vertical, transverse cross section of the internal drum recorder of FIG. 4, being taken as indicated by section lines VI—VI in FIG. 4.

Continuing to refer to FIG. 4, and referring as well to FIG. 6, spinner 70 includes a shaft 88, which is rotatably mounted on a carriage 90 by means of a pair of bearings 92, 94. While these bearings 92, 94 are shown as ball bearings, they may alternatively be bearings of another type, such as air bearings. The drum 62 includes a slot extending between lower drum edges 96, through which the carriage 90 descends to be slideably mounted on a pair of rails 98, by means of three sliding bearings 100. The rails 98 are in turn mounted to extend between a front frame member 102 and a rear frame member 104. The carriage 90 is driven along rails 98 by means of a lead screw 106 turning within a mating nut 108 attached to the carriage 90. The lead screw 106 is rotationally driven by a motor 110 through a pair of gears 112. Alternatively, a linear motor and control system can be used to drive the carriage assembly.

In the example of FIG. 4, the image data, defining the desired latent image to be written on the medium 68, is stored in a memory 114, which may be a portion of the internal drum recorder 50 or a portion of a computer connected to the drum recorder 50. To produce the signal driving amplitude modulator circuit 80, this image data is matched with data describing the longitudinal location of carriage 90 along the rails 98, in the direction of arrow 71, together with the angular position of spinner 70 as it turns about longitudinal axis 58. The location of carriage 90 along the rails 98 is determined within a location decoder circuit 116 from inputs provided by a linear encoder 118, which travels with the carriage 90 along an encoder scale 120, and by a rotary encoder 122, having a rotor turning with motor drive shaft 124. The angular position of spinner 70 is determined by a rotary encoder providing the relative angular position of a rotating circuit board 126 rotating as part of spinner 70, and a non rotating circuit board 128 fastened to carriage 90. Data describing the angular position of spinner 70 is sent both to the location decoder 116 and to a motor drive circuit 130, from a rotary encoder 132, which, being fastened to non rotating circuit board 128, reads an encoder scale 133 fastened to rotating circuit board 126.

The rotation of spinner 70 is brought about by a brushless DC motor 134 (or any other conventional motor) including a rotor 136 affixed to the spinner shaft 88, and a stator 138 affixed to a cylindrical cover 140 which is concentric with the shaft 88. The stator 138 includes coils 142 over a magnetic structure 144, while the rotor 136 includes material permanently magnetized to present a number of magnetic poles to the stator 138. Rotation of the rotor 136, and hence of spinner 70, occurs as various coils 142 are energized through motor drive circuit 130. Using information received from the rotary encoder 132, motor drive circuit 130 directs electrical current from an external power supply 146 through the particular coils 142 that are, for example, to be attracted by adjacent magnetic poles within the rotor 136 to set and control the speed of the motor.

Because of a relatively high rotational speed of spinner 70, as required to achieve adequate throughput, and because of particular requirements for high reliability and low electromagnetic noise, non contact methods are chosen for transmitting both data signals and electrical power between non rotating circuit board 128 and rotating circuit board 126. Thus, the electrical power required to various circuits within spinner 70 is derived from a brushless generator 150 having a stator 152 affixed to the cylindrical cover 140 and a rotor 154 affixed to the shaft 88. The stator 152 is composed of a permanently magnetized material, while the rotor 154 includes various coils 156 wired to produce an output current within wires 158 extending through a hole 160 in the shaft 88. These wires 158 in turn provide an input to a power supply 162 within the spinner 70 and rotating therewith. The power supply 162 produces the voltage levels required for the operation of various circuits within the spinner 70.

Within imaging logic 164, the location of spinner 70, as calculated within location decoder 116, is used to determine which portion of the image data stored in memory 114 should be used to drive the amplitude modulator 86. When this determination is made, an image data signal is sent from imaging logic 164 to a connector 166 plugged onto a header in non rotating circuit board 128. Each circuit board 126, 128 includes a number of concentric conductive rings 168, with the rings 168 of non rotating circuit board 128 being disposed adjacently to the rings of 168 rotating circuit board 126. When the signals from imaging logic 164 are applied to the rings 168 of non rotating circuit board 128, capacitive coupling causes corresponding signals to appear on corresponding rings 168 of rotating circuit board 126. The rings of rotating circuit board 126 are connected to a detecting circuit 169, which detects the presence of signals from imaging logic 164, and which provides an input to amplitude modulating circuit 80 in accordance with such signals. In this way, all of the signals needed for spot modulation of the laser beam 66 are brought into the spinner 70 through capacitive coupling.

The rotary encoder 132 determining the angular position of spinner 70 may also operate by capacitive coupling as well, operating in accordance with changes in capacitance measured at various conductive segments arrayed around an annular portion of the rotating circuit board 126 to form the rotary scale 133. Alternately, rotary encoder 132 may be configured as an optical encoder viewing a rotary scale 133 with various optically identifiable markings. Optical encoders of this type are well known to those of ordinary skill in the art of building such devices.

A media feed assembly 170, for directing individual sheets of media into the drum 62, will now be described, with particular reference being made to FIG. 6. The media feed assembly includes a drawer 172, in which a stack 174 of media sheets is placed, with each media sheet having its imaging layer exposed upward. Whenever a media feed operation is to be performed, removing a media sheet from the drum 62, and/or placing a new media sheet within the drum 62, the carriage 90 is moved to the front of the recorder 50, to the position indicated by dashed lines 173 in FIG. 4. In this position, the descending portion of carriage 90 does not interfere with the movement of media sheets into, or out of, the drum 62.

When a new sheet of media is required during operation of the internal drum recorder 50, the uppermost sheet in stack 174 is picked by a vacuum pick mechanism 176, which also drives the leading edge of the media sheet into the drum 62. The vacuum pick mechanism 176 includes a vacuum bar 178 having a number of vacuum cups 180 in communication with a flexible hose (not shown) selectively applying a vacuum through the cups 180. The vacuum bar 178 is slideably mounted on a pivoting bracket 182, with a shaft 184 affixed to the bar 178 at each end thereof sliding through the bracket 182 within an aligned pair of holes (not shown). The vacuum bar 178 is moved along each shaft 184 by a lead screw 186 engaging an internally threaded hole (not shown) in a drive block 188 fastened to the shaft 184. Each lead screw 186 is rotated by a motor 190 fastened to pivoting bracket 182, with the two motors 190 being electrically synchronized to provide similar movement of each end of vacuum bar 178. The pivoting bracket 182 is in turn pivotally mounted on a pin 192 at each end of drawer 172, being pivoted by a solenoid or small motor (not shown). Each shaft 184 also lies outward from the closest end of drawer 172, so that the shafts and associated drive blocks 188 can move downward past the drawer 172 as the bracket 182 is pivoted upward.

Referring to FIGS. 4 and 6, to pick a single sheet of media from stack 174, vacuum bar 178 is held downward, with vacuum cups 180 in contact with the stack 174, as a vacuum is applied through the cups 180, attaching the top sheet of media within the stack to each cup. The pivoting bracket 182 is then pivoted upward, so that vacuum bar 178 is brought into the position indicated by dashed lines 194, lifting the leading portion of the top sheet of media. Next, the lead screw drive motors 190 are turned on to move vacuum bar 178 into the position indicated by dashed lines 196, moving the leading edge of the top sheet of media into engagement with a gripper bar 200 extending along inner surface 60 of drum 62 from a gripper wheel 204. At an end opposite its cantilever attachment to the gripper wheel 204, the gripper bar 200 is supported by a rotatably mounted roller 205 operating along inner surface 60 of the drum 64.

Figure 7:
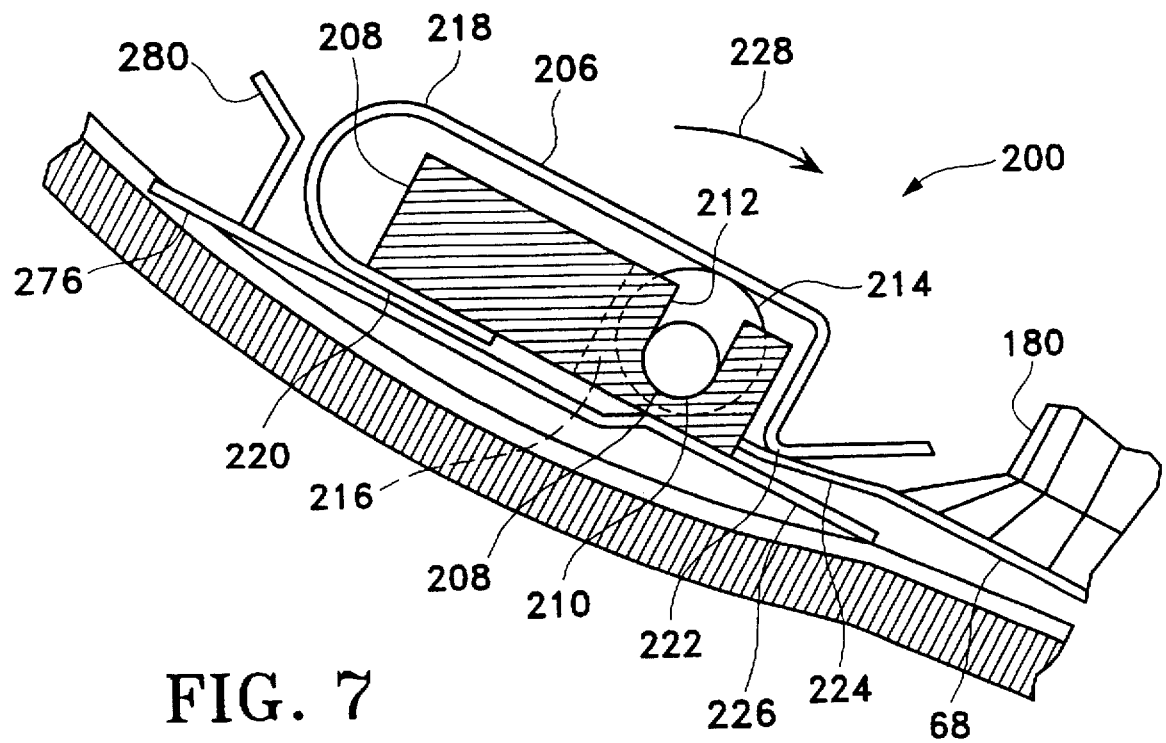
FIG. 7 is a transverse cross sectional view of a gripper bar within the internal drum recorder of FIG. 4, taken as indicated by section lines VII—VII in FIG. 4.

FIG. 7 is a transverse cross sectional view of the gripper bar 200, taken as indicated by section lines VII—VII in FIG. 4. The gripper bar 200 includes a support bar 206 and a torque bar 208, which includes a rod portion 210 rotatably mounted within a longitudinal slot 212 of support bar 206 and a number of spaced apart eccentric disks 214 together with slots 216 of support bar 206. The eccentric disks 214 may be attached to the rod portion 208, or both the disks 214 and the rod 208 may be integral parts of the torque bar 208.

A spring clip 218 is attached to support bar 206 at a first end 220, and is formed downward to form a contact surface 222 holding a leading edge 224 of media sheet 68 against a lower clip 226. This clamping action is dependent on the rotational position of torque bar 208. With the torque bar 208 in the position shown, eccentric disks 214 hold the spring clip 218 upward, so that an opening is provided between contact surface 222 and the underlying lower clip 226. When the torque bar 208 is rotated from this position in the direction of arrow 228, the movement of eccentric disks 214 releases the upward force on spring clip 218, allowing contact surface 222 to close against leading edge 224 of the media sheet 68. The spring clip 218 may extend continuously across the portion of gripper bar 200 into which medium leading edge 224 is driven, or two or more relatively short spring clips 218 may be used to grasp discrete portions of the leading edge 224.

The mechanism used to rotate the gripper bar 200 around the inside of drum 62 (shown in FIG. 4), so that the media sheet 64 is brought into place for recording with its leading edge in engagement with the gripper bar 200, will now be discussed, with continuing reference to FIGS. 4 and 6. The support bar 206 of gripper bar 200 is fastened and at a rear end to rear gripper wheel 204, and is supported at a front end by roller 205. Gripper wheel 204 is rotatably mounted by means of a bearing 234 affixed therein, turning on a hollow shaft 236 extending inward from rear frame member 104. An opening 238 within the shaft 236 allows the passage therethrough of laser beam 66. Gripper wheel 204 includes gear teeth 240 extending around its periphery in engagement with a drive gear 242 rotationally driven by a gripper drive motor 246.

Figure 8:
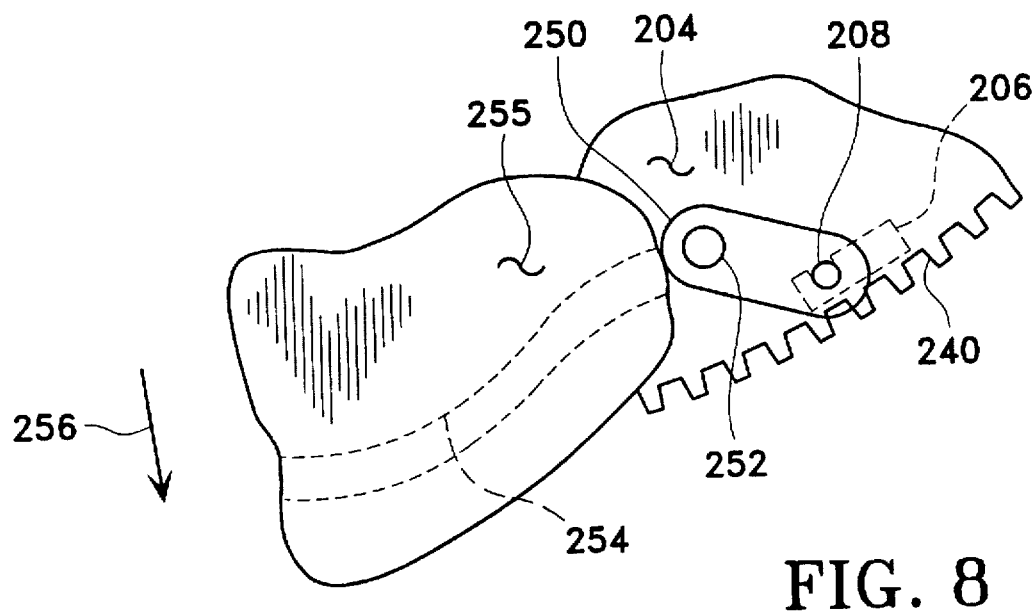
FIG. 8 is a fragmentary rear elevational view of the internal drum recorder of FIG. 4, showing particularly the means used to open and close a gripper mechanism within the gripper bar of FIG. 7.

FIG. 8 is a fragmentary rear elevational view of the internal drum recorder of FIG. 4, showing particularly the means used to effect rotation of the torque bar 208 relative to the support bar 206. An end of torque bar 208 extends outward through a hole (not shown) in rear support wheel 204, being attached to a crank 250 having a pin 252 sliding within a groove 254 extending around an inner surface of a rear drum support plate 255.

Referring to FIGS. 7 and 8, the transition of the groove 254 radially outward, in the direction indicated by arrow 256 causes the torque bar 208 to be rotated in the direction of arrow 228, closing contact surface 222 against the leading edge 224 of media sheet 68.

Figure 9:
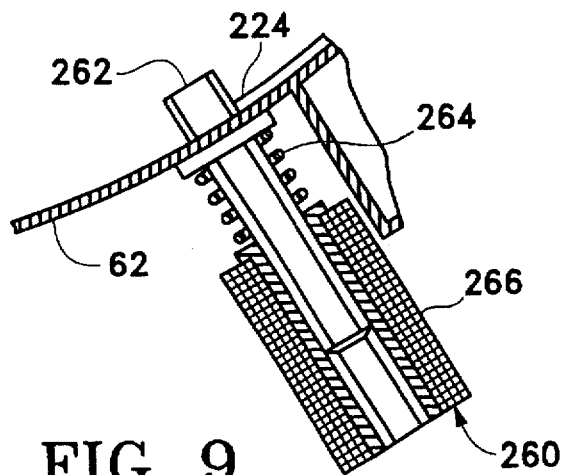
FIG. 9 is a fragmentary transverse cross sectional view of the internal drum recorder of FIG. 4, showing particularly a solenoid mechanism used to stop movement of the media sheet.

FIG. 9 is a fragmentary transverse cross section of the internal drum recorder 50, showing particularly a solenoid mechanism 260 used to stop movement of the media sheet 68 by contacting the leading edge 224 thereof. When the solenoid mechanism 260 is not electrically activated, a plunger 262 extends into the drum 62, being held therein by a compression spring 264, to block the passage thereby of the leading edge portion 224 of media sheet 68. When the solenoid mechanism 260 is electrically activated, the flow of current through a coil 266 causes the withdrawal of the plunger 262 from the interior of drum 62. The internal drum recorder man include one or several of these solenoid mechanisms 260.

Referring to FIGS. 7 and 9, while the groove 254 is preferably configured so that the leading edge portion 224 of media sheet 68 is released from spring clip(s) 218 as the solenoid plunger 262 is encountered, it is also desirable to configure the thickness and shape of spring clip(s) 218 so that the leading edge portion 224 is pulled away from contact area 222, overcoming the frictional forces developed between this area and lower clip 226, when the extended solenoid plunger 262 is encountered.

Referring again to FIGS. 4 and 6, drum 62 is preferably formed as a curved vacuum platen, with cylindrical inner surface 60 having a number of spaced apart small holes extending into a cavity 270, which is selectively connected to a vacuum when media sheet 68 is to be held in place, or to the atmosphere when media sheet 68 is to be moved in contact with the inner surface 60. Media can also be formed to the inner surface of the drum by keeping it in compression without the use of vacuum.

Continuing to refer to refer to FIG. 6 and referring again to FIG. 7, the various operations occurring as a media sheet is selected and moved into place within the drum 62 will now be described. First, vacuum pick mechanism 176 is moved downward, bringing vacuum cups 180 into contact with the top sheet of media stack 174, and a partial vacuum is established through the cups 180, so that the top sheet can be picked up. Next, the vacuum pick mechanism 176 is rotated to bring vacuum bar 178 into the position indicated by dashed lines 194. Then lead screw drive motors 190 are turned on to move the vacuum bar 178 into the position indicate by dashed lines 196, with the leading edge portion 224 of the media sheet 68 in contact with gripper bar 200.

At this point, the spring clip 218 is held open so that the leading edge portion 224 is pushed under contact surface 222. Gripper drive motor 246 is turned on to drive the gripper bar 200 in the direction indicated by arrow 274, with the lead screw drive motors continuing to drive vacuum bar 178, so that leading edge 224 stays in contact with gripper bar 200 as the spring clip 218 is closed by movement past the transition in groove 254 (shown in FIG. 8). Next, the vacuum connection to vacuum cups 180 is released, and lead screw drive motors 190 are turned on to return vacuum bar 178 to the position indicated by dashed lines 194. Continued movement of gripper bar 200 in the direction of arrow 274 brings the media sheet 68 completely onto the inner surface 60 of drum 62. Movement of the media sheet 68 is stopped by contact of the leading edge 224 with the extended plunger(s) 262 of solenoid mechanism(s) 260. The gripper bar 200 is returned to the position indicated in FIG. 6, with the spring clip 218 being opened by a second transition in groove 254. At this point, the drum cavity 270 is connected to a vacuum to hold the media sheet 68 in place against the drum inner surface 60.

Continuing to refer to FIGS. 6 and 7, gripper bar 200 includes provisions for pushing a media sheet 68 out of the drum 62. Lower clip 226 extends to include one or more tabs 276 extending into one or more corresponding grooves 278 in inner surface 60 of drum 64. When the gripper bar 200 is returned to the position of FIG. 6, as described above, it is not moved as far as the trailing edge of the media sheet 68 held in place within the drum. When the process of exposing the media sheet 68 to a light pattern developed within the drum 64 is completed, the gripper bar 200 is again moved in the direction of arrow 274, so that the trailing edge of the media sheet 68 is caught between an underlying tab 276 and an overextending tab 280. With the trailing edge of media sheet 68 positioned in this way rotational movement of gripper bar 200 is continued, as the sheet 68 is pushed outward, falling into an output tray 282. This motion of gripper bar 200 is then stopped with the bar 200 again in the position indicated on FIG. 6, awaiting the delivery of a new media sheet by the vacuum pick mechanism 176.

The groove 278 may extend circumferentially around inner drum surface 60, or, if tab 276 is sufficiently flexible, it may terminate, past the point at which the trailing edge of media sheet 68 is encountered, with a ramp surface deflecting the tab 276 inward to the radial level of the remainder of inner surface 60.

Referring to FIGS. 4 and 6, internal drum recorder 50 preferably also includes a focussing mechanism which is occasionally used to perform automatic adjustments of the geometry of the drum 62. This function is of value because the depth of focus is an internal drum recorder is small, depending particularly on the optics used to focus a beam image on media sheet 68. For example, the surface of the media sometimes must be held within a tolerance range of 200 microns. Such tolerances significantly increase the cost of building a drum assembly. Unfortunately, even when such a drum is constructed accurately, various factors, such as shipping, handling, and temperature variations may introduce dimensional variations affecting performance. Furthermore, it is particularly desirable to provide a method allowing the inner diameter of the drum to be adjusted easily to compensate for changes in the thickness of various types of sheet media which can be used in the drum recorder 50. Thus, an autofocus feature is provided by mounting a focus detector 284 within the spinner 70 and by providing a number of actuators 286 which are used to change the radial distance from the longitudinal axis 58, about which the spinner rotates, and inner drum surface 60.

The focus detector may be, for example, of a type described by Donald K. Cohen, Wing Ho Gee, M. Ludeke, and Julian Lewkowicz in *APPLAED OPTICS*, Vol. 23, No. 4, Feb. 15, 1984, p. 565, which is commonly used in providing an auto focus function in compact disk optical players. As shown in FIG. 5, this method is implemented by using a single light beam 288 for focus detection. A polarizing beam splitter 290 is placed in the path of this light beam 288, so that a portion of the light reflected from the surface of media sheet 68 (or of a reflective sheet substituting for the media sheet) is reflected to the focus detector 284. This detector 284 may include an astigmatic lens and a quadrant detector to provide an indication of whether the surface of media sheet 68 is in focus, too close, or too far away. Additional polarizing filters may be added at either side of polarizing beam splitter 290. The outputs of detector 284 are fed back through adjacent pairs of rings 168 from rotating circuit board 126 to non rotating circuit board 128, and are directed within non rotating circuit board 128, to connector 166. From connector 166, these signals are directed to focus logic 292.

The drum 62 is particularly configured to allow the independent variation of the distances between the longitudinal axis 58, about which the spinner 70 rotates, and individual portions of internal drum surface 60. The drum 62 is externally fastened to a number of struts 294, each of which extends between a pair of actuators 286, fastened respectively to a front drum support plate 296 and rear drum support plate 255. Both drum support plates 296, 255 are fastened to a left support plate 298 along with the frame members 102, 104. Since the struts 294 are fastened to the outer surface of drum 62, a number of posts 295 extend within the drum 62 adjacent to each strut 294, tying inner drum surface 60 to each movement of the strut 294. Each actuator 286 is configured to move in a direction which is radial relative to the longitudinal axis 58. The maximum excursion of each actuator is limited to, for example, 5 millimeters or less. This maximum excursion may be limited primarily by the maximum expected difference between the thicknesses of plates to be used. Each actuator 286 may be of a thermal, mechanical, or piezoelectric type.

Despite the use of a separate, particular sub-beam 288 for the autofocus function, this function cannot be provided during the process of imaging media sheet 68; the light used for autofocus would form a line along the media sheet. For example, the autofocus process may be applied several times during the day to compensate for dimensional variations due to mechanical creep and thermal expansion, and, most importantly, whenever a different type of media, having a different thickness, is to be used.

During the autofocus process, spinner 70 is rotated by motor 134 and, optionally, translated by lead screw drive motor 110. These motors may be operated at the same speeds otherwise used for imaging, or they may be operated at different speeds for optimizing the focussing process. During this process, focus logic 292 uses inputs from location decoder 116 to determine, both the rotational and position of the spinner 70 and the translational position of carriage 90 along the shafts 98. As focus detector 284 provides an output signal occurring on a real time basis, focus logic 292 uses data from location decoder 116 to determine the particular actuator 286 which must be operated to adjust the radial distance presently associated with the signal. When focus detector 284 indicates this radial distance is too great, the actuator 286 is operated to reduce this distance. When focus detector 284 indicates that this radial distance is too short, the actuator 286 is operated to increase this distance. With the rotation of spinner 70, the focal distances are repeatedly checked, and are brought into a desired range by continued operation of the associated actuators 286.

In one mode of operation the actuators 286 attached to front drum support plate 296 are each used to bring all of the struts 294 into proper alignment at this plate 296 with the carriage 90 moved so that spinner 70 is near this plate 296. Next, lead screw drive motor 110 is used to move carriage 90 so that spinner 70 is near rear end plate 255, and the actuators 286 attached to this plate 255 are used to bring each strut 294 into proper alignment at this plate 255.

Certain aspects of the autofocus process are dependent upon the particular type of device chosen for the actuators 286. A mechanical actuator using, for example, a differential screw mechanism is chosen, maintains the position to which it is driven until it is driven to a new position. On the other hand, various types of actuators require the continued application of a driving signal to maintain a position. If such a continued driving signal is required, the necessary drive signals are encoded and stored in memory 114. If non volatile storage is used for this purpose, it is unnecessary to repeat the focussing process after the recorder 50 is powered on.

Figure 10:
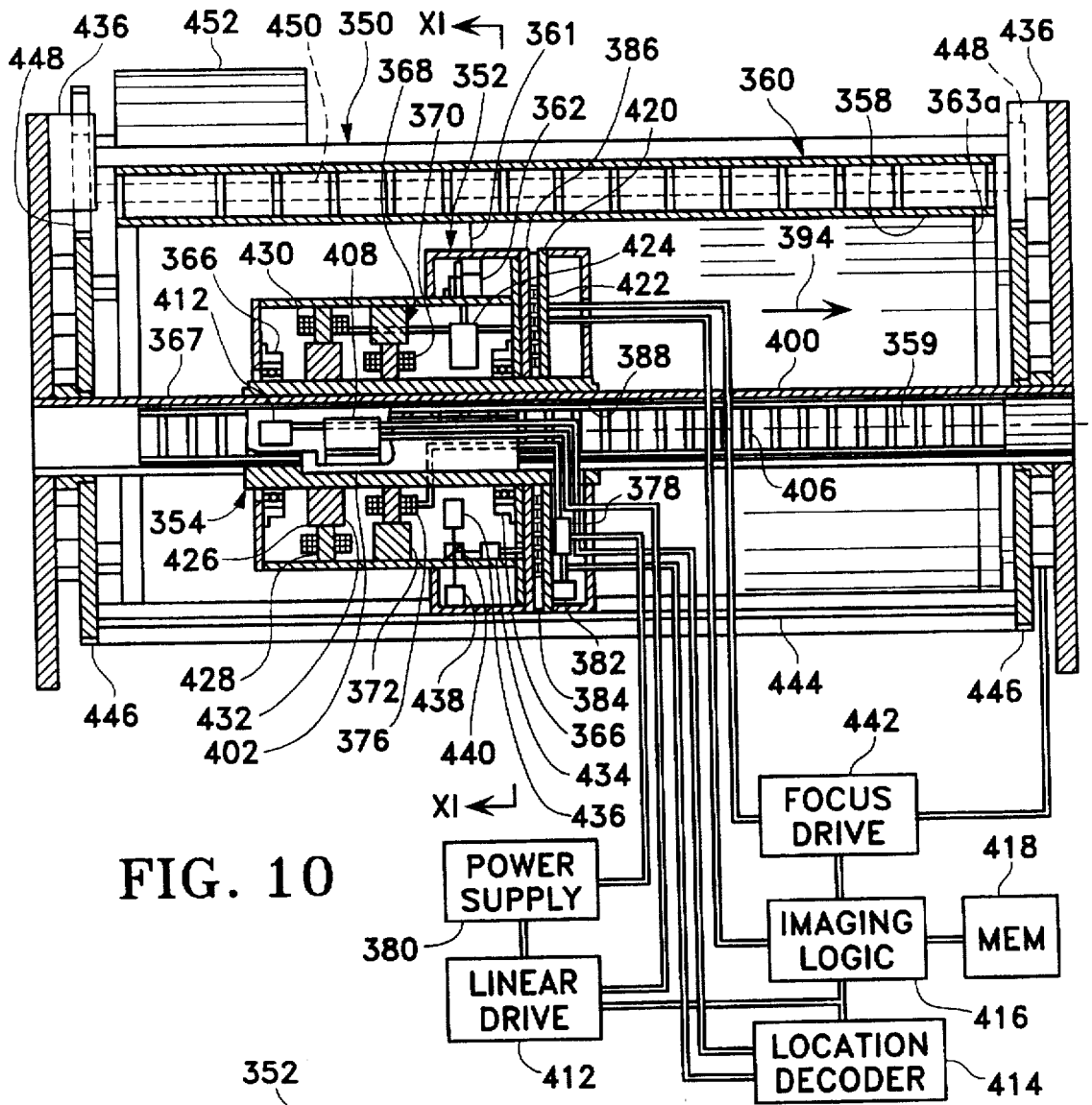
FIG. 10 is a vertical and longitudinal cross sectional view of an internal drum recorder built in accordance with a second embodiment of the present invention.
Figure 11:
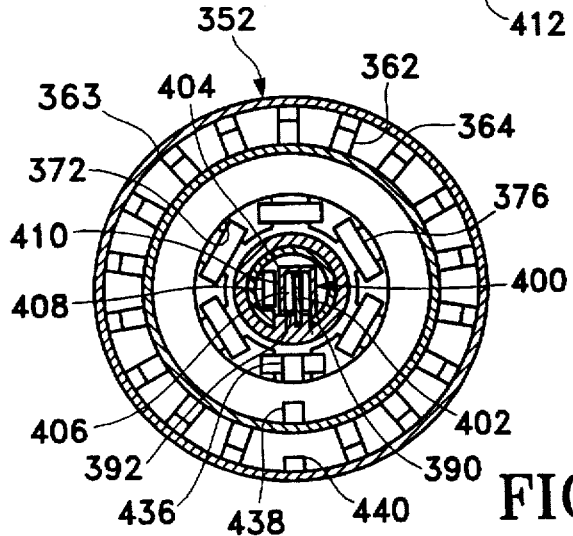
FIG. 11 is a transverse cross sectional view of the internal drum recorder of FIG. 10, taken as indicated by section lines XII—XII in FIG. 10.

FIGS. 10 and 11 are views of a second embodiment 350 of the present invention, with FIG. 10 being a longitudinal cross sectional view thereof, and with FIG. 11 being a transverse cross sectional view of a spinner 352 and a slider 354 therein.

In second embodiment 350, a media sheet 356, held against an internal surface 358 of a drum 360 having an axis 359, is imaged by a number of individually switched laser diodes 362 extending in a helical pattern inward from the peripheral surface 364 of the spinner 352. Each laser diode 362 has associated therewith an optical package 363 focussing energy 361 from the diode 362 on the medium 363a held within the drum 360. The spinner 352 is rotatably mounted on slider 354 by means of a pair of bearings 366. While these bearings 366 are shown as ball bearings, other types of bearings, such as air bearings, may be used. The slider 354 is moved along a single central shaft 367. The spinner 352 is rotationally driven by a brushless DC motor 368 including a stator 370 affixed to the slider 354 and a rotor 372 affixed to a cylindrical portion 374 of the spinner 352. The rotor 372 includes a number of permanently magnetized poles which are directed inward toward the stator 370. Various coils 376 are electrically driven by a motor drive circuit 378, using electrical power from a power supply 380 in accordance with signals provided by a rotary encoder 382, which is responsive to rotation of the spinner 352, being directed at an encoder scale 384 extending around a rotating circuit board 386 forming part of the spinner 352. This method assures that coils 376 are switched on and off with the adjacent passage thereby of magnetized poles in rotor 372, providing the start and continuation of rotary motion.

Slider 364 includes internal surfaces 388 engaging the central shaft 367 and a key portion 390 extending into a mating slot 392 of the shaft 367. These internal surfaces 388 may be formed, for example, using rolling, recirculating elements or as an air bearing. This arrangement allow longitudinal movement of the slider 354 along the shaft 367, in and opposite the direction indicated by arrow 394, while preventing rotation of the slider 354 on the shaft 367.

Longitudinal movement of the slider 354, and hence of spinner 352 rotating thereon, is provided by a linear motor 400, consisting of a circuit card 402 including one or more circuit coils, fastened to extend into shaft 367 from slider key 390, and a magnet channel 404, fastened within the shaft 367. The magnet channel 404 includes a number of permanent magnets 406, arranged on each side of circuit card 402 in alternating polarities, so that oppositely directed magnetic fields are presented to the coil(s) of circuit card 402 as the slider 354 moves along shaft 367. A linear encoder 408 reading an encoder scale 410 extending along a side of magnet channel 404, provides an output signal to the linear motor drive circuit 412, which switches the coil(s) of circuit card 402 as the various positions of magnets 406 are passed by the coils, thereby starting and continuing longitudinal motion in the direction desired. Power is directed to linear motor drive circuit 412 from power supply 380 in a manner indicating the desired direction of movement.

The outputs of rotary encoder 382 and linear encoder 408 are also provided to a location decoder circuit 414, which in turn provides an output to an imaging logic circuit 416. The imaging logic circuit 416 accesses image information from a memory 418 to determine when the individual laser diodes 362 should be switched on or off to provide the desired latent image on the surface of media sheet 356.

As previously discussed with respect to FIG. 4, like the first embodiment 50 of the present invention, this second embodiment 350 includes a non rotating circuit board 420 adjacent to a rotating circuit board 386, with a number of capacitively coupled, concentric pairs of conductive rings 422, between which data is exchanged without mechanical contact. In the second embodiment 350, the outputs of imaging logic 416 are driven across various of these pairs of rings 422 from the non rotating circuit board 420 to the rotating circuit board 386. From rotating circuit board 386, the outputs of imaging logic 416 provide inputs to diode driving circuits 424, which switches the individual laser diodes 362. Since the various laser diodes 362 are arrayed around the peripheral surface 364, the position of each diode 362 is considered in determining the timing at which it is switched. This driving circuit 424, being, The diode driving circuit 424 is mounted to rotate as a portion of spinner 352.

The electrical power requirements of diode driving circuit 424 are met by a generator 426 which uses a portion of the power developed by the motor 368. The generator 426 includes a rotor 428 having a coil 430 connected to diode driving circuit 424. Various power supply elements (not shown), such as a voltage regulator and a filter, may be included in this connection. The stator 432 of generator 426 includes various permanently magnetized poles which cause the current flow within coil 430 as this coil 430 is rotated.

Also as previously described with respect to FIG. 4, like the first embodiment 50 of the present invention, this second embodiment 350 includes a focus detector 434, which is used occasionally to correct the focal distances from the spinner 352 to the surface of medium 363a, through the operation of a number of actuators 436 moving struts 440 attached to the drum 360. In the example of FIG. 10, the focus detector 434 is illuminated by light directed to the media 363a, or a reflective surface being substituted for the media, from a dedicated laser diode 436. Light from this diode 436 travels through focussing optics 438 and is reflected within a polarizing beamsplitter 440 into the detector 434. The output of the focus detector 434 is used by focus drive logic 442 to control the actuators 436. Depending on the type of devices used for actuators 436, electronic memory may be required to hold the positions determined during the focussing process, which occurs as generally described above with respect to FIG. 4.

This alternative embodiment 350 preferably includes a gripper bar 444, which operates generally as the gripper bar 200 of the first embodiment, as described with respect to FIGS. 4, 7, and 8, facilitating the insertion of individual sheets of medium 363a within the drum 360 and their removal therefrom.

In this embodiment 350, a significant advantage arises from the central mounting and driving of spinner 352. It is unnecessary to move the spinner to permit movement of the medium 363a. Furthermore, the gripper bar 444 can be moved completely around the shaft 367 without interfering with the spinner 352 in any position. The gripper bar 444 is mounted at each end on a gripper wheel 446, which is turned by meshing engagement with a drive gear 448 attached to a shaft 450. At one end, the shaft 450 is driven by a motor 452.

Figure 12:
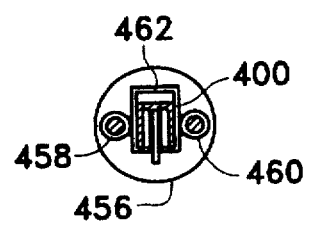
FIG. 12 is an isometric view showing the geometric problems, associated with deflecting multiple light beams within an internal drum recorder, which are solved by using the present invention.

FIG. 12 is a transverse elevational view of an alternative slider 456 for use in the second embodiment 350. This slider 456 is slideably mounted on a pair of shafts 458 by means of bearings 460, which may, for example, be linear bearings using rolling elements, such as balls or rollers, or which may be air bearings. A linear motor 400 is generally as described above with respect to FIG. 10. An encoder 462 moving with the slider 456 reads an encoder scale 464 atop the magnet channel of linear motor 400.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. An apparatus for recording an image on a medium, comprising:

a hollow drum means having an internal surface, at least a portion of which is cylindrical, for holding said medium, said cylindrical portion of said drum means having a longitudinal axis passing through said center of said cylindrical portion of said drum means;

a spinner, on a translating mechanism located on said center of said cylindrical portion of said drum means, which encircles a rail, said spinner having a radius orthogonal to the axis of rotation of said hollow drum means;

a plurality of energy beams emanating from said spinner directed at said medium;

a means for translating said plurality of energy beams in a direction parallel to said longitudinal axis;

a means, mechanically linked to said translating means, for rotating said energy beams about said longitudinal axis;

a first energy source for powering said means for translating said plurality of energy beams in a direction parallel to said longitudinal axis and for powering said means for rotating said energy beams about said longitudinal axis; and a second energy source derived from said first energy source for powering the source of said energy beams.

2. The recording apparatus according to claim 1 further including means for modulating said energy beams in accordance with the image being recorded.

3. The recording apparatus according to claim 2 further comprising a means for creating said second energy source from said rotational motion of said energy beams.

4. The recording apparatus according to claim 2 further including means for compensating for the distance traveled by said beams.

5. The recording apparatus according to claim 3 further including means for coupling said second energy source and data to said rotating means.

6. The recording apparatus according to claim 1 further including said translating means translating said energy beams parallel to said longitudinal axis while said energy beams are rotated.

7. The recording apparatus according to claim 6 further including means for coupling said second energy source to said rotating means.

8. The recording apparatus according to claim 6 further including means for coupling said second energy source and data to said rotating means.

9. The recording apparatus according to claim 6 further including means for compensating for the distance traveled by said beams.

10. The recording apparatus according to claim 1 further comprising a means for creating said second energy source from said rotational motion of said energy beams.

11. The recording apparatus according to claim 1 further including means for compensating for the distance traveled by said beams.

12. The recording apparatus according to claim 1 further including means for coupling said second energy source and data to said rotating means.

13. The recording apparatus according to claim 12, further comprising a rotor mechanically affixed to said rotating means, adjacent said source of said energy beams, and a stator mechanically coupled to said translating means.

14. The recording apparatus according to claim 13 further including electrical energy transfer means between said rotor and stator.

15. The recording apparatus according to claim 14 wherein said electrical energy transfer means is electromagnetic means and said data transfer means is by capacitive coupling means.

16. The recording apparatus according to claim 12 further including a rotor mechanically coupled to said rotating means and a stator mechanically coupled to said translating means, said energy beams being provided from said rotor.

17. The recording apparatus according to claim 16 further including electrical energy transfer means between said rotor and stator.

18. The recording apparatus according to claim 17 wherein said electrical energy transfer means is electromagnetic means.

19. An apparatus for recording an image on a medium comprising:
- a hollow drum means having an internal surface, at least a portion of which is cylindrical, for holding said medium, said cylindrical portion of said drum means having a longitudinal axis passing through the center of said cylindrical portion of said drum means;
- a first member;
- a rotating second member mechanically coupled to said first member, said second member having a radius orthogonal to the axis of rotation of said hollow drum means;
- at least one energy source for providing a plurality of modulated energy beams directed towards said drum means;
- means for rotating said second member;
- means for translating said first member and said second member; and
- means for providing electrical energy and data signals to said second member.

20. The recording apparatus according to claim 19 further including said energy beams being modulated in response to said data signals.

21. The recording apparatus according to claim 20 including said energy beams being spaced around the periphery of said second member.

22. The recording apparatus according to claim 20 wherein said energy and data providing means includes electromagnetic means for providing electrical energy to said second member and capacitive coupling means for providing data signals to said second member.

23. The recording apparatus according to claim 20 further including said energy source being a plurality of laser diodes and said energy beams being light beams.

24. The recording apparatus according to claim 20 further including means for compensating for the distance between said second member and said medium.

25. The recording apparatus according to claim 19 including at least a portion of said second member being concentric to said first member.

26. The recording apparatus according to claim 25 including said energy beams being spaced around the periphery of said second member.

27. The recording apparatus according to claim 25 wherein said energy and data providing means includes electromagnetic means for providing electrical energy to said second member and capacitive coupling means for providing data signals to said second member.

28. The recording apparatus according to claim 25 further including said energy source being a plurality of laser diodes and said energy beams being light beams.

29. The recording apparatus according to claim 25 further including means for compensating for the distance between said second member and said media.

30. The recording apparatus according to claim 25 including at least a portion of said first member being laterally adjacent to said second member.

31. The recording apparatus according to claim 19 including at least a portion of said first member being laterally adjacent to said second member.

32. The recording apparatus according to claim 19 including said energy beams being spaced around the periphery of said second member.

33. The recording apparatus according to claim 19 wherein said energy and data providing means includes electromagnetic means for providing electrical energy to said second member and capacitive coupling means for providing data signals to said second member.

34. The recording apparatus according to claim 19 further including said energy source being a plurality of laser diodes and said energy beams being light beams.

35. The recording apparatus according to claim 19 further including means for compensating for the distance between said second member and said medium.

\* \* \* \* \*